US008950705B2

United States Patent
Schievelbusch

(10) Patent No.: US 8,950,705 B2
(45) Date of Patent: Feb. 10, 2015

(54) DEVICE FOR MONITORING THE SYNCHRONISM OF FLAPS OF AN AIRCRAFT WING

(75) Inventor: Bernd Schievelbusch, Lindenberg (DE)

(73) Assignee: Liebherr-Aerospace Lindenberg GmbH, Lindenberg/Allgau ( * ) Notice: Subject to any disclaimer, the term of this patent is extended or adjusted under 35 U.S.C. 154(b) by 1535 days.

(21) Appl. No.: 12/148,232

(22) Filed: Apr. 17, 2008

(65) Prior Publication Data

US 2008/0265090 A1 Oct. 30, 2008

(30) Foreign Application Priority Data

Apr. 18, 2007 (DE) .......................... 10 2007 018 330

(51) Int. Cl.
*B64C 3/38* (2006.01)
*B64C 5/10* (2006.01)
*B64C 9/00* (2006.01)
*B64C 13/00* (2006.01)
*B64D 45/00* (2006.01)

(52) U.S. Cl.
CPC ...... *B64D 45/0005* (2013.01); *B64D 2045/001* (2013.01)
USPC ........................................................ 244/99.3

(58) Field of Classification Search
USPC .............. 244/99.3, 99.2, 75.1, 212–215, 220, 244/221, 99.4
See application file for complete search history.

(56) References Cited

U.S. PATENT DOCUMENTS

| 1,674,546 | A | * | 6/1928 | Flettner | 244/82 |
| 2,614,774 | A | * | 10/1952 | Donovan | 244/216 |
| 3,188,021 | A | * | 6/1965 | Young | 244/207 |
| 4,181,276 | A | | 1/1980 | Kogure et al. | |
| 4,533,096 | A | * | 8/1985 | Baker et al. | 244/75.1 |
| 5,628,477 | A | * | 5/1997 | Caferro et al. | 244/214 |
| 5,680,124 | A | | 10/1997 | Bedell | |
| 6,466,141 | B1 | * | 10/2002 | McKay et al. | 340/963 |

FOREIGN PATENT DOCUMENTS

| DE | 10223495 | 12/2003 |
| EP | 0726201 | 8/1996 |
| WO | 2009043568 | 4/2009 |

OTHER PUBLICATIONS

European Search Report mailed Sep. 10, 2014.

* cited by examiner

*Primary Examiner* — Valentina Xavier
(74) *Attorney, Agent, or Firm* — Dilworth & Barrese, LLP.

(57) ABSTRACT

This invention relates to a device for monitoring the synchronism of one or more flaps of aircraft wings, wherein the device includes a control cable which is connected with the flaps such that the control cable follows the flap movement. In accordance with the invention, the path of installation of the control cable extends from a first point to a second point, one or both of which are arranged on non-movable structural components of the aircraft wing.

21 Claims, 4 Drawing Sheets

DEVICE FOR MONITORING THE SYNCHRONISM OF FLAPS OF AN AIRCRAFT WING

BACKGROUND OF THE INVENTION

The present invention relates to a device for monitoring the synchronism of one or more flaps of aircraft wings, wherein the device includes a control cable which is connected with the flaps such that the control cable follows the flap movement.

For influencing the lift and the drag coefficient of the aircraft wings, airplanes are equipped with various flaps which change the aerodynamic properties of the aircraft wings in the desired way. In accordance with the present application, the term "flap" is meant to include any such component which is movable with respect to fixed structural components of the aircraft wing and with which aerodynamic properties can be influenced. Examples include leading-edge flaps and landing flaps.

It is desired, for instance, that for take-off and landing the aircraft has slow flight properties, whereas in cruise flight the leading-edge flaps and landing flaps must be positioned such that fast flight properties can be realized. During operation, the undesired case may happen that malfunctions in the drive system of the flaps occur, which depending on the kind of malfunction can lead to skewing, misalignment or even the loss of individual flaps or flap segments. This involves the disadvantage that the aerodynamic properties of the wings are impaired in an undesired way, for instance by rolling moments or also by consequential damages upon loss of the flaps.

To be able to detect such undesired conditions in time, it is known to monitor the synchronism of flaps of a high-lift system by a control cable mechanism. Such systems are known from U.S. Pat. No. 5,680,124 and EP 0 726 201 A1. In the systems known from these references, the cable ends of the control cable abut against the movable flaps to be monitored. In the case of a malfunction during the movement of one or more flaps, the distance between these stop points is increased, which can be detected by a suitable sensor system. One disadvantage in the system known from the prior art consists in that due to the arrangement of the control cable stop points on the flaps the entire sensor mechanism must follow the movement of the flaps. Another disadvantage consists in that in the systems known from the prior art it is merely possible to detect malfunctions of the movement of two adjacent flaps of an aircraft wing. The known system cannot be used, if only one flap per wing is present or must be monitored.

Finally, it must be regarded as disadvantageous that the drive mechanisms at the outer and inner flap ends, i.e. the outermost and innermost drive mechanisms, cannot be monitored by the known system, as the control cable does not extend up to the vicinity of the same.

SUMMARY OF THE INVENTION

Therefore, it is the object underlying the present invention to develop a device for monitoring the synchronism of one or more flaps of an aircraft wing to the effect that the same has a comparatively simple construction and has an extended functionality as compared to the system known from the prior art.

In accordance with the invention, this object is solved by a device with the features herein. Accordingly, it is provided that the path of installation of the control cable extends from a first point to a second point, one or both of which are arranged on non-movable structural components of the aircraft wing. Such configuration of a monitoring device provides for performing the monitoring also for the case that for each aircraft wing only one flap is provided or only one flap must be monitored. In addition, the system can also be used for monitoring the flap ends both outboard and inboard, as the path of installation of the control cable also can extend beyond the flap ends up to the non-movable structural components. In so far, the device in accordance with the invention includes a functional improvement as compared to the known monitoring system, without the complexity of the monitoring device being increased.

Another advantage is obtained in that the sensor element need not necessarily be arranged on the movable flap, which is disadvantageous in so far as the connection of the necessary electric line to the sensor element need not be guided over the gap of variable extension between fixed and movable structural parts of the wing.

In a further aspect of the invention it is provided that for each half wing, i.e. half span, one or also more control cables are provided. If a plurality of control cables are provided for each half wing, different groups of flaps or also different individual flaps can separately be subjected to monitoring.

In a further aspect of the invention it is provided that the path of installation of the control cable extends such that it extends from a first point through the one or more flaps to a second point such that during the trouble-free operation of the flaps the length of the path of installation is independent of the flap position. Thus, it is conceivable that in the retracted condition of the flaps the length of the path of installation corresponds or substantially corresponds to the length of the path of installation in the extended condition of the flaps, so that the control cable has the same state of tension in both positions. However, if the movement of a flap proceeds asynchronously, for instance because one of the drive mechanisms or the drive mechanism of the flap does not operate or does not operate in the desired way, the path of installation is changed in its length, so that the control cable is tensioned or relaxed, which by means of a suitable sensor element, e.g. a switch, a distance sensor and the like, can be converted into an electric signal, which in turn activates for instance safety mechanisms of the system. It is conceivable, for instance, that a signal is generated, which leads to the stopping of the drive system, and/or that a corresponding warning signal is generated in the cockpit of the aircraft.

It is likewise possible that in the trouble-free operation the length of the path of installation is changed with a change of the flap position by a certain amount. In this case it is also possible that it is detected whether during the movement of the flaps from one to another position this certain amount of the change in length is achieved, which can suitably be measured directly or indirectly. If this is the case, the trouble-free operation would be inferred. If this is not the case, it can be detected that a malfunction exists, which—as explained above—can lead to a stopping of the system and/or to the generation of a warning signal.

In a further aspect of the invention it is provided that the first point and the second point in direction of movement of the flaps are offset with respect to each other. It is conceivable, for instance, that one of the points is arranged at or in the vicinity of the edge of the aircraft wing and that the other of the points by contrast is set back from the edge of the aircraft wing. Thus, it is possible that the path of installation of the control cable is independent of the position and movement of the flaps, as during extension of the flaps the path of installation on one side of the flaps is increased by the amount by which it is decreased on the other side of the flaps.

In a further aspect of the invention it is provided that the control cable is guided over deflection rollers, which are arranged at the lateral edges of the flaps. It is also conceivable to guide the control cable over deflection rollers which are not arranged at the lateral edges of the flaps, but are set back with respect to the lateral edges.

By choosing the distance between the deflection rollers and the flap edges, it is possible to adjust the response sensitivity of the system. The closer the deflection rollers are located to the flap edge, the greater the influence of an asynchronous course of the flaps on the length of the path of installation, i.e. the greater the response sensitivity of the device. Thus, a variation of the response sensitivity can be adjusted by positioning the deflection rollers. It is conceivable to construct the deflection rollers so as to be variable in position, in order to be able to individually adjust the response sensitivity.

In a further aspect of the invention it is provided that the control cable runs over the entire width or an essential part of the width of the flaps.

In a further aspect of the invention it is provided that the control cable furthermore is guided over fixed structures, such as an engine bracket. The device in accordance with the present invention does not exclude such arrangement, but provides for detecting the asynchronous course of one or more flaps in this case as well.

It can be provided that the control cable is guided over structure-mounted deflection rollers. These deflection rollers serve to arrange the path of installation of the control cable around the fixed structure.

It is conceivable that on both sides of the fixed structure flaps are located, with which the control cable is connected or through which the control cable extends. Furthermore, it can be provided that the structure-mounted deflection rollers are arranged such that in the trouble-free operation of the flap the length of the path of installation of the control cable from one flap adjoining the fixed structure to the other flap adjoining the fixed structure is not changed or is changed by a certain amount. It can be provided that at least two of the structure-mounted deflection rollers are arranged offset with respect to each other in the direction of movement of the flaps. Thus, it is possible that the length of the path between one of these structure-mounted deflection rollers and the deflection roller of the adjoining flap is increased or decreased by the amount by which the length of the path of installation from the other structure-mounted roller to the deflection roller of the flap adjoining the same is decreased or increased. On the whole, it can thus be achieved that the path of installation is independent of the flap position also in the case of structure-mounted deflection rollers.

BRIEF DESCRIPTION OF THE DRAWINGS

Further details and advantages are explained by means of an embodiment illustrated in the drawing, in which.

DESCRIPTION OF THE PREFERRED EMBODIMENTS

Figure 1:
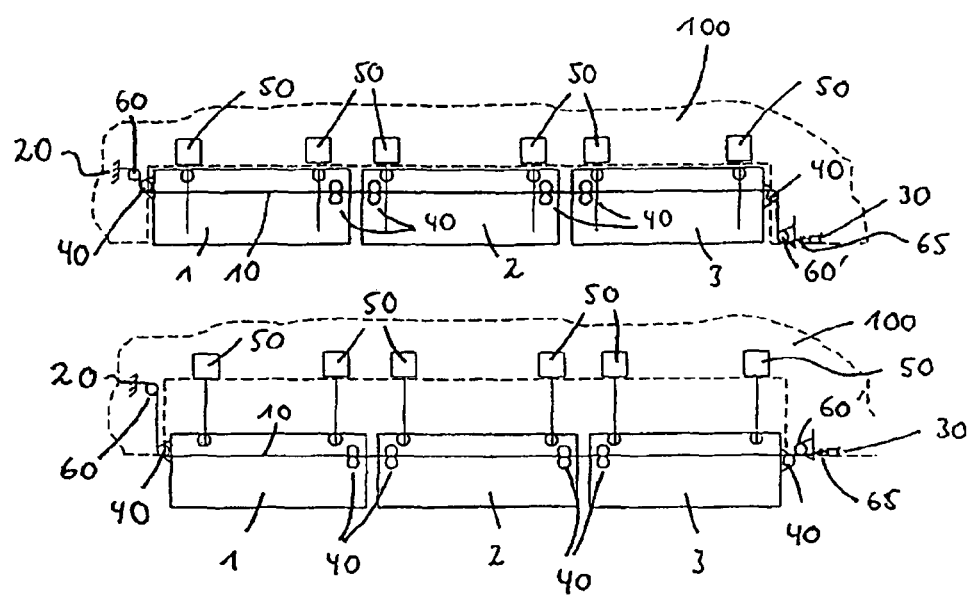
FIG. 1: shows the arrangement of the control cable with retracted and extended flaps.

In FIG. 1, the reference numerals 1, 2, 3 designate three flaps arranged one beside the other, which are for instance leading-edge flaps or landing flaps. FIG. 1, upper representation, shows the flaps 1, 2, 3 in the retracted condition. Reference numeral 100 designates the structure-mounted part of the illustrated half wing of an aircraft.

The path of installation of the control cable 10 extends between the points 20, 30, which both are stationary, i.e. arranged on structure-mounted parts 100 of the aircraft wing. The reference numerals 40 designate deflection rollers, which are arranged on the flaps 1, 2, 3 and are moved together with the same.

The reference numerals 50 finally designate drive units for moving the flaps 1, 2, 3, of which drive units two are provided per flap in the embodiment shown in FIG. 1.

As can furthermore be taken from FIG. 1, the control cable 10 is firmly connected with the one end point 20 of the path of installation. Via a spring 65, the other end of the control cable 10 is connected with the other end point 30 of the path of installation. This leads to the fact that the length of the path of installation can be varied within certain limits. If the length of the path of installation is changed, this will lead to the spring being loaded or relieved, which can be measured by suitable sensors.

As can furthermore be taken from FIG. 1, two deflection rollers 60, 60' are arranged on the structure-mounted, i.e. non-moved structural component 100 of the half wing, one of which (60') is located in the vicinity of the wing edge and the other one (60) is set back with respect to the same. This leads to the fact that the length of the path of installation is not changed during extension of the flaps (FIG. 1, lower representation), which in turn results in the tension of the spring 65 remaining unchanged.

Figure 2:
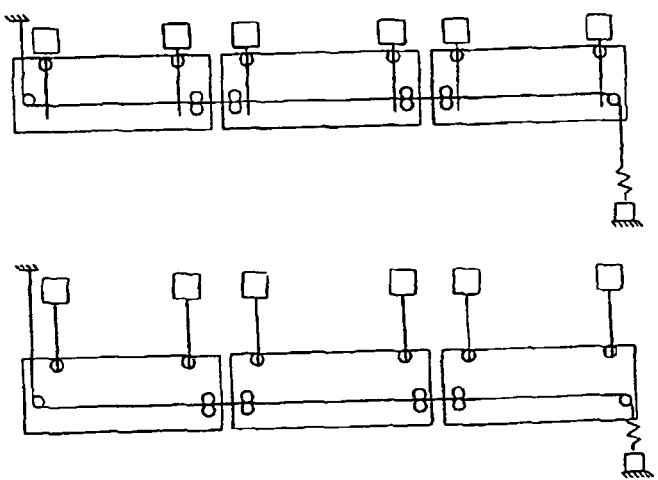
FIG. 2: shows a simplified representation of the arrangement as shown in FIG. 1, FIG. 3: shows an arrangement of the control cable system with synchronizing error of a flap with low response sensitivity.

FIG. 2 shows the arrangement of FIG. 1 in a simplified representation, wherein identical components or components having the same function are provided with the same reference numerals as in FIG. 1.

Figure 3:
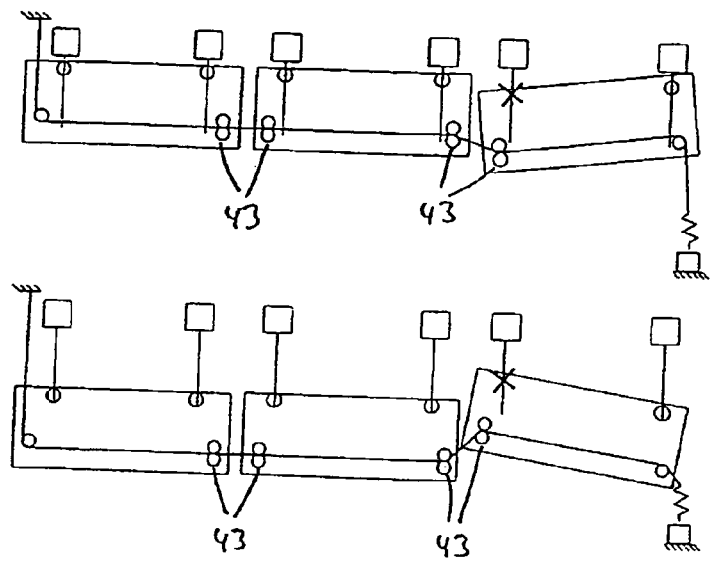

In the case of a synchronizing error of one or more flaps 1, 2, 3, the length of the path of installation is changed, hence also the tension of the control cable 10 and thus also of the spring 65, which can be measured in a suitable way. FIG. 3 shows this condition, in which there is a synchronizing error of the flap shown on the right both during retraction and during extension, respectively. In both cases, an elongation of the path of installation is obtained as compared to the synchronous condition as shown in FIG. 1 and FIG. 2, and thus an increase in the spring force, which can be measured.

Figure 4:
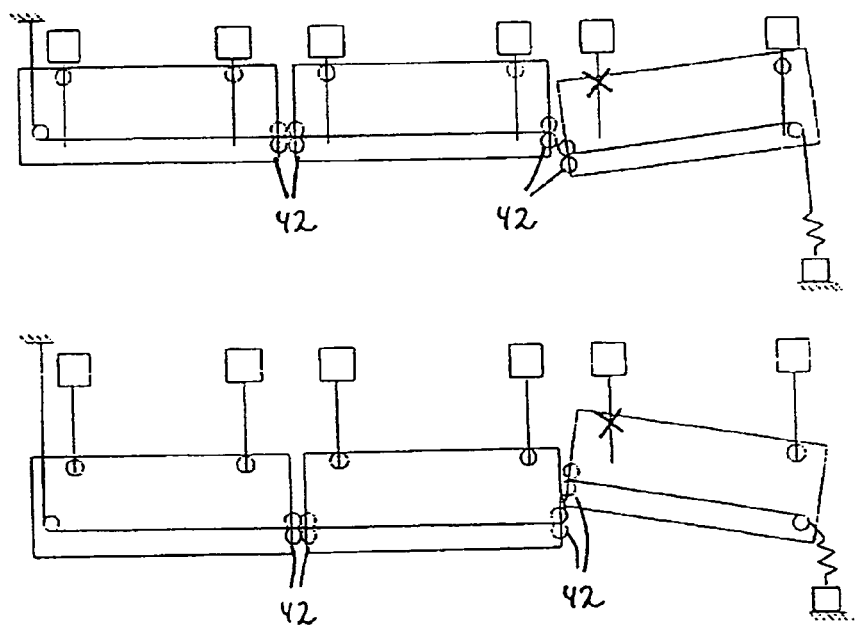
FIG. 4: shows an arrangement of the control cable system with synchronizing error of a lap with high response sensitivity.
Figure 5:
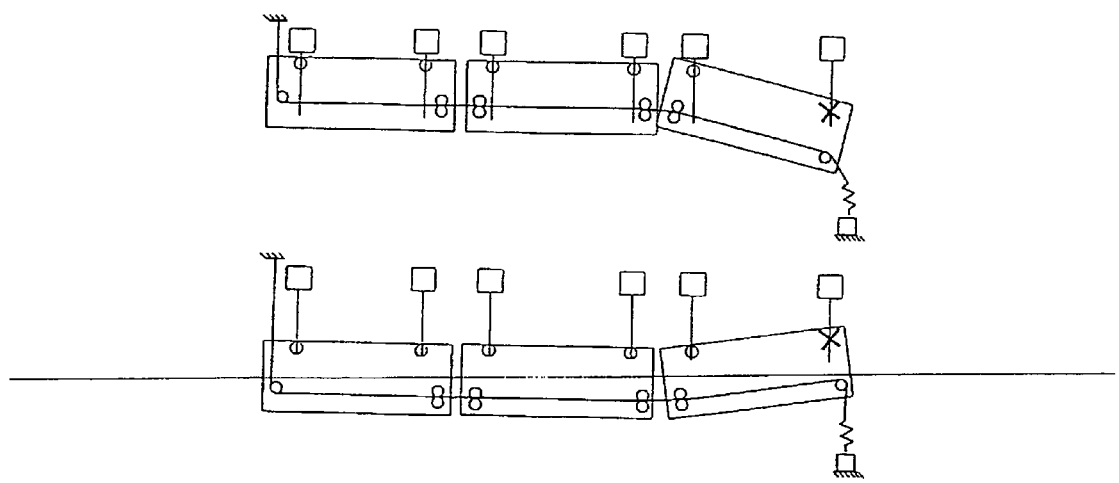
FIG. 5: shows an arrangement of the control cable system with synchronizing error on the inboard flap end during retraction/extension.

For reasons of better clarity, the reference numerals are omitted in FIGS. 3, 4 and 5.

In the embodiment shown in FIG. 3 and in FIG. 4, all deflection rollers are disposed on the flaps and not on structure-mounted components of the wing. In the terminal regions facing each other, the flaps each include deflection rollers, which are, however, arranged at a certain distance from the flap edges, as shown in FIG. 3. This results in a comparatively low response sensitivity, as the change in length of the path of installation is smaller than in the case of the corresponding deflection rollers being located directly at or closer to the edge of the flap, as is the case in the Figure. This Figure likewise shows a synchronizing error of the flap shown on the right during retraction and extension, respectively, but with a high response sensitivity of the system.

Due to the fact that in accordance with the present embodiment at least one of the end points of the path of installation is stationary, it is possible to also detect synchronizing errors at the flap end. Such embodiment is shown in FIG. 5, in which a malfunction of the drive unit occurs at the flap shown on the right. In the embodiment shown here, the malfunction exists on the inboard flap end of the flap shown on the right during retraction and extension, respectively.

Figure 6:
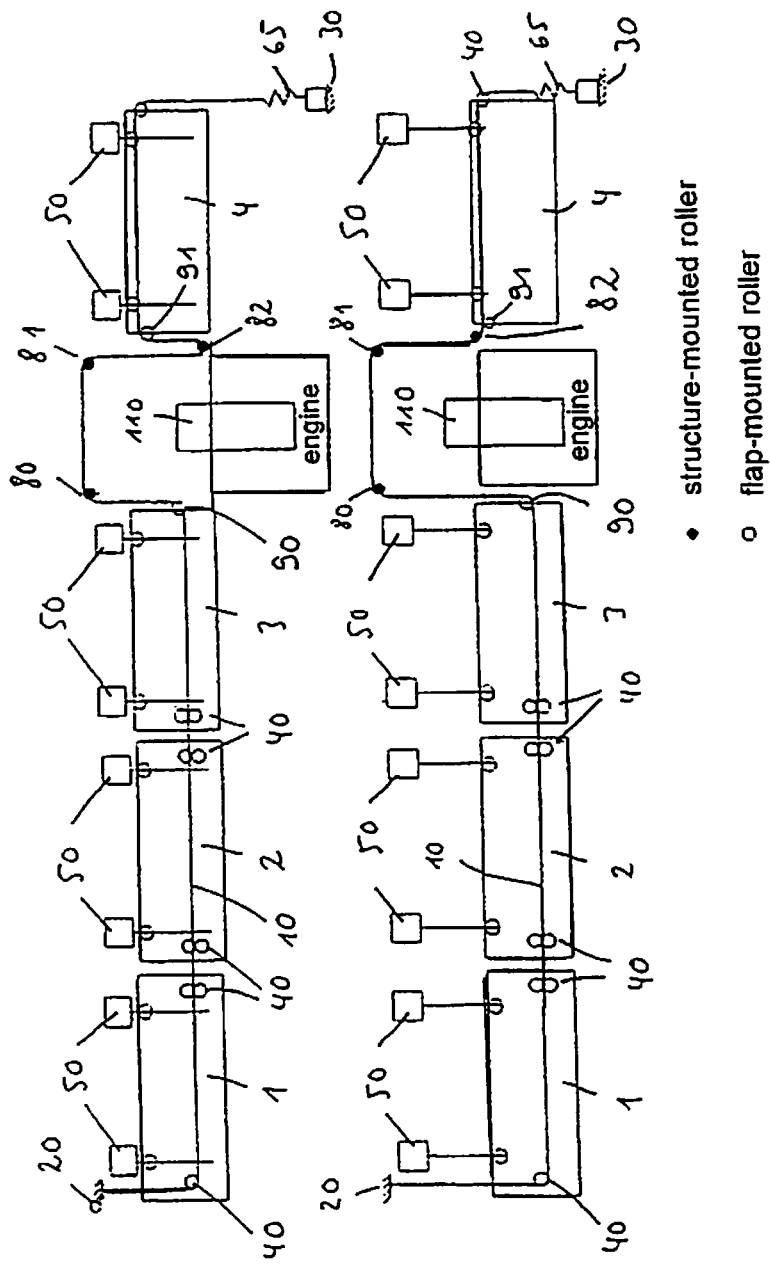
FIG. 6: shows an arrangement of the control cable system via a fixed structure, for instance an engine bracket.

FIG. 6 shows an embodiment of the present invention, in which the control cable is guided over structure-mounted rollers 80, 81, 82, which pass for instance over an engine bracket 110. In FIG. 6, the structure-mounted rollers are designated with the reference numerals 80, 81, 82. On both sides of the engine bracket 110, the flaps 3, 4 are located, with the flap 4 forming the inboard flap of the illustrated half wing.

In this embodiment, too, the end points 20, 30 of the path of installation of the control cable 10 are stationarily arranged.

From the two structure-mounted rollers 80, 82, the control cable runs to a deflection roller 90, 91 of the respectively adjacent flap 3 or 4. The deflection rollers 90, 91 are arranged such that on the side of the flap 3 an elongation of the path between the structure-mounted deflection roller 80 and the adjacent deflection roller 90 of the adjacent flap 3 is obtained during extension of the flaps, and on the side of the flap 4 a shortening of the path between the structure-mounted deflection roller 82 and the adjacent deflection roller 91, as is shown in FIG. 6. On the whole, it is achieved that by means of the illustrated arrangement, the length of the path of installation between the deflection rollers 90, 91 via the structure-mounted deflection rollers 80, 81, 82 of the flaps 3 and 4 remains constant in the trouble-free operation of the arrangement.

The example of FIG. 6 shows an engine bracket 110 as a non-movable structure. Of course, the invention is not restricted thereto. Other stationary structures, such as landing gear structures or also the wing assembly itself, can also be configured as non-movable structures. In the latter case, the system can be installed through the fuselage to the opposed half wing. This means a minimum of system complexity (one cable, one sensor for the entire wing) and hence a maximum of reliability at low cost.

The invention claimed is:

1. A device for monitoring the synchronism of one or more movable flaps of an aircraft wing, said aircraft wing having fixed structural components which are non-movable relative to the movable flaps, wherein the device includes a plurality of control cables which are provided for each half wing wherein different groups of flaps or different individual flaps are separately monitored for synchronized alignment, wherein the control cables are connected with the flaps such that the control cables follow flap movement, and paths of installation of the control cables extend from a first point to a second point, one or both of which are fixedly mounted on the non-movable structural components of the aircraft wing wherein the control cables are guided over deflection rollers which are arranged on the flaps.

2. The device according to claim 1, wherein cable is provided.

3. The device according to claim 1, wherein the paths of installation of the control cables extend from the first point through the one or more flaps to the second point such that in normal operation of the flaps the length of the paths of installation is independent of a position of the flap.

4. The device according to claim 1, wherein the paths of installation of the control cables extend from the first point through the one or more flaps to the second point such that in normal operation of the flaps the length of the path paths of installation are changed by a certain amount with a change in a position of the flap.

5. The device according to claim 1, wherein the first point and the second point are offset with respect to each other in a direction of movement of the flaps.

6. A device for monitoring the synchronism of one or more movable flaps of an aircraft wing, said aircraft wing having fixed structural components which are non-movable relative to the movable flaps, wherein the device includes a plurality of control cables which are provided for each half wing wherein different groups of flaps or different individual flaps are separately monitored for synchronized alignment, wherein the control cables are connected with the flaps such that the control cables follow flap movement, and paths of installation of the control cables extend from a first point to a second point, one or both of which are fixedly mounted on the non-movable structural components of the aircraft wing, wherein one of the points is arranged at or in a vicinity of an edge of the aircraft wing.

7. The device according to claim 1, wherein the deflection rollers are arranged at lateral edges of the flaps.

8. The device according to claim 1, wherein the deflection rollers are set back from lateral edges of the flaps.

9. The device according to claim 1, wherein the control cable runs over an entire width or an essential part of the width of the flaps.

10. The device according to claim 1, wherein the control cables are guided over fixed structures.

11. A device for monitoring the synchronism of one or more movable flaps of an aircraft wing, said aircraft wing having fixed structural components which are non-movable relative to the movable flaps, wherein the device includes a plurality of control cables which is are provided for each half wing wherein different groups of flaps or different individual flaps is separately monitored for synchronized alignment, wherein the control cables are connected with the flaps such that the control cables follow flap movement, and paths of installation of the control cables extend from a first point to a second point, one or both of which are fixedly mounted on the non-movable structural components of the aircraft wing, wherein the control cables are guided over fixed structure-mounted deflection rollers.

12. The device according to claim 10, wherein on both sides of the fixed structure flaps are located, with which the control cables are connected.

13. A device for monitoring the synchronism of one or more movable flaps of an aircraft wing, said aircraft wing having fixed structural components which are non-movable relative to the movable flaps, wherein the device includes a plurality of control cables which are provided for each half wing wherein different groups of flaps or different individual flaps is separately monitored for synchronized alignment, wherein the control cables are connected with the flaps such that the control cables follow follows flap movement, and paths of installation of the control cables extend from a first point to a second point, one or both of which are fixedly mounted on the non-movable structural components of the aircraft wing, wherein the control cables are guided over fixed structures, wherein on both sides of the fixed structure flaps are located, with which the control cables are connected, and wherein structure-mounted deflection rollers are arranged such that in the normal operation of the flaps the length of the paths of installation of the control cables from one flap adjoining the fixed structure to the other flap adjoining the fixed structure is not changed or is changed by a certain amount.

14. The device according to claim 11, at least two of the structure-mounted deflection rollers are arranged offset with respect to each other in a direction of movement of the flaps.

15. The device according to claim 14, wherein in a retracted condition of the flaps a structure-mounted deflection roller is set back with respect to the adjacent deflection roller of the adjacent flap, and that a further structure-mounted deflection roller is offset with respect to the adjacent deflection roller of the adjacent flap in direction of movement of the flaps.

16. The device according to claim 2, wherein the paths of installation of the control cables extend from the first point through the one or more flaps to the second point such that in the normal operation of the flaps the respective lengths of the paths of installation are independent of the flap position.

17. The device according to claim 2, wherein the paths of installation of the control cables extend from the first point through the one or more flaps to the second point such that in normal operation of the flaps the respective lengths of the paths of installation is are changed by a certain amount with a change in the flap position.

18. The device according to claim 11, wherein on both sides of the fixed structure flaps are located, with which the control cables are connected.

19. The device according to claim 13, wherein at least two of the structure-mounted deflection rollers are arranged offset with respect to each other in a direction of movement of the flaps.

20. The device according to claim 13, wherein at least two of the structure-mounted deflection rollers are arranged offset with respect to each other in a direction of movement of the flaps.

21. The device of claim 1 wherein both of two ends of each control cable are fixedly mounted to the non-movable structural components of the aircraft wing.

\* \* \* \* \*